July 4, 1967

G. KUNZ ET AL 3,328,849

MOLD MEMBER FOR TIRE TREADS

Original Filed Dec. 30, 1963

INVENTORS
GERALD KUNZ
BY SAMUEL E. STOVER

ATTY.

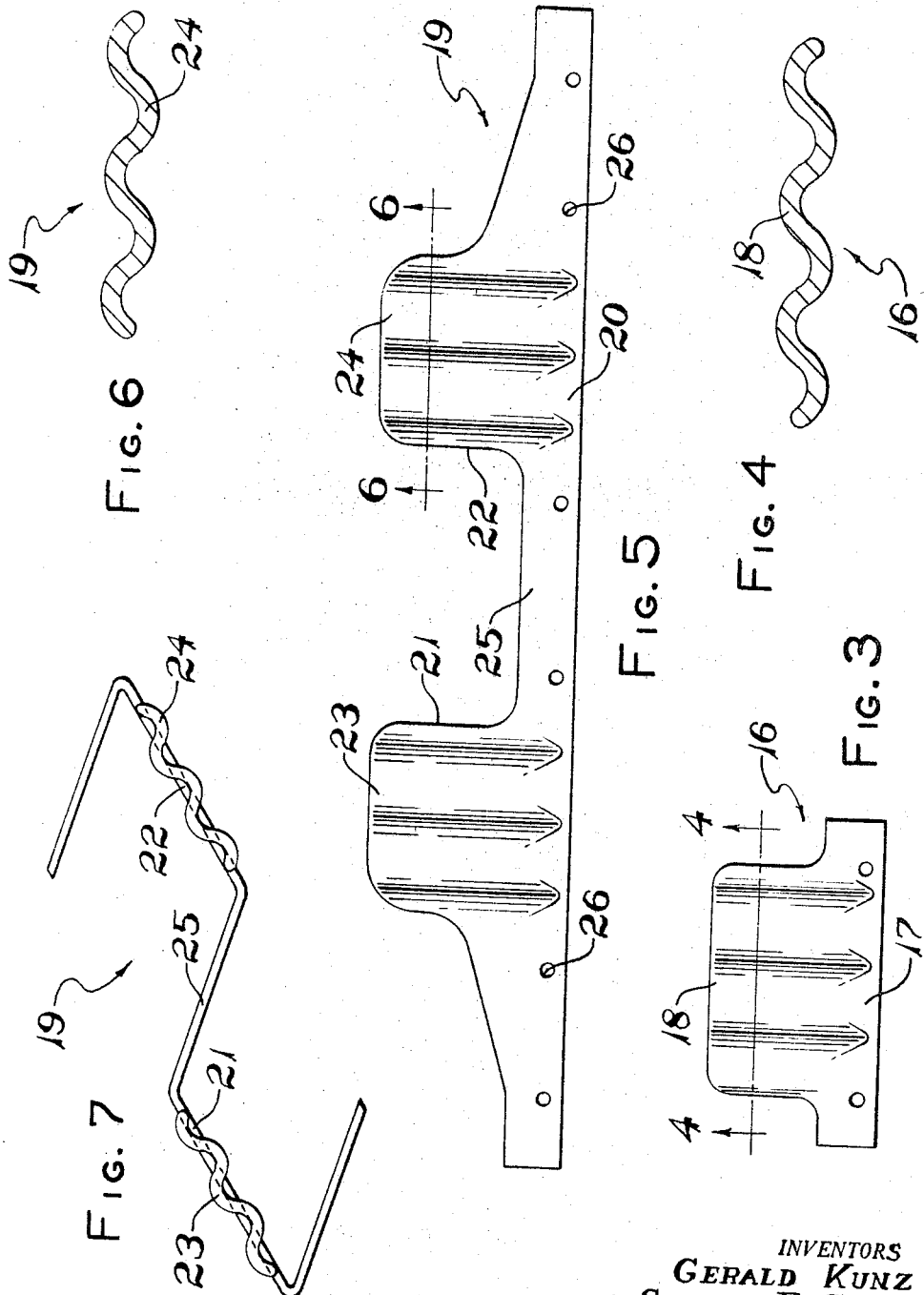

United States Patent Office 3,328,849
Patented July 4, 1967

3,328,849
MOLD MEMBER FOR TIRE TREADS
Gerald Kunz, Cuyahoga Falls, Ohio, and Samuel E. Stover, Grabill, Ind., assignors to The B. F. Goodrich Company, New York, N.Y., a corporation of New York
Original application Dec. 30, 1963, Ser. No. 334,378, now Patent No. 3,199,567, dated Aug. 10, 1965. Divided and this application Apr. 12, 1965, Ser. No. 447,337
5 Claims. (Cl. 18—44)

This invention relates to improvements in mold members for forming grooves in the traction pattern of the elastomer tread for a pneumatic tire, and, more particularly, to thin elongated mold members of shape such that, during molding of the tire, slit-like grooves are formed in the tread which have a configuration at the tread surface that differs from the configuration at a location radially inwardly of the surface. This application is a division of our copending application Ser. No. 334,378, filed Dec. 30, 1963 which issued Aug. 10, 1965 as Patent No. 3,199,567.

Pneumatic tires for vehicles now customarily have the elastomeric running surface or tread provided with a traction assisting pattern comprising load-bearing portions separated by grooves of appreciable width. In addition, the load-bearing portions are frequently provided with slit like grooves or kerfs to increase the edge areas of the load-bearing portions and thereby improve the traction and other desirable characteristics of the tread pattern. These kerfs or slit-like grooves have, however, occasioned annoyance and damage as the result of picking up small stones and other hard objects. Thus, these foreign objects while adjacent the surface of the tread cause irritating noise during rotation of the tire on a paved surface. When such objects are not removed, they have frequently "worked" or "drilled" radially inwardly of the tread during continued use of the tire resulting in damage to it.

In accordance with this invention, the traction pattern in the elastomer tread of a pneumatic tire has slit-like grooves formed therein during molding of the tire by improved mold members so shaped that the sidewalls of at least a part of the grooves, radially inwardly of the tread surface, are formed with undulations or corrugations extending in the direction transverse of the depths of the grooves while the edge portions of said grooves at the tread surface are devoid of the said undulations or corrugations. This configuration of the slit-like grooves resists entrance of small stones and other foreign objects into the grooves and also facilitates expulsion of such objects as are picked up by the outer edge portions of the grooves. Moreover, the interlocking action of these undulations or corrugations improves the lateral stability of the tread. Preferably, the said undulations or corrugations are of sinuous configuration and are produced during molding as the result of employing in the tire mold thin elongated members of appropriate configuration. Specifically, the tire mold, in the portion which forms the traction pattern, includes blade-like inserts which are elongated strips of thin metal with at least a part of the length thereof provided with undulations or corrugations extending transversely of the member from one longitudinal edge to a location adjacent to but spaced from the other longitudinal edge and with the portion of the inserts adjacent the said other longitudinal edge devoid of the said undulations or corrugations.

The nature of the invention is hereinafter further explained with reference to the accompanying drawings, forming a part of this application, in which:

FIG. 3 is a side elevational view of one form of a blade-like member for molding the slit-like grooves in a tire tread;

FIG. 4 is a sectional view taken on the section indicating line 4—4 of FIG. 3;

FIG. 5 is a side elevational view of the presently preferred form of blade-like member for molding the slit-like grooves and showing the member before it is bent to a configuration for use in a traction pattern of the configuration shown in FIGS. 1 and 2;

FIG. 6 is a sectional view taken on the section indicating line 6—6 of FIG. 5; and FIG. 7 shows the manner in which the member of FIG. 5 is bent to a configuration appropriate for a traction pattern similar to that illustrated in FIGS. 1 and 2.

Figure 1:
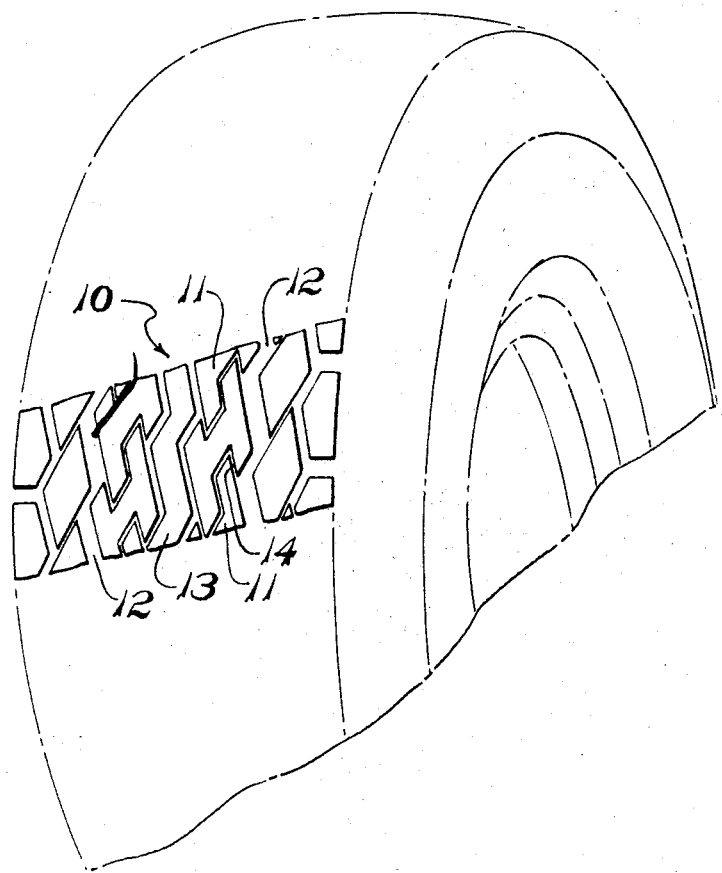
FIG. 1 is a fragmentary perspective view of the presently preferred tire tread traction pattern formed by mold members of the invention, the traction pattern continuing throughout the circumference of the tire which is indicated by dot-dash lines.

The tire tread 10, illustrated in FIG. 1, is formed of elastomeric material in which a traction pattern comprising load-bearing portions 11, separated by generally circumferentially extending grooves 12, is formed during the vulcanization of the tire. The load-bearing portions 11 on either side of a central rib 13 are additionally provided with slit-like grooves or kerfs 14 which divide these load-bearing portions into a plurality of closely adjacent blocks that may be of desired configuration. As here shown, the blocks adjacent the central rib 13 are generally H-shaped while the laterally adjacent blocks are diamond shaped.

Figure 2:
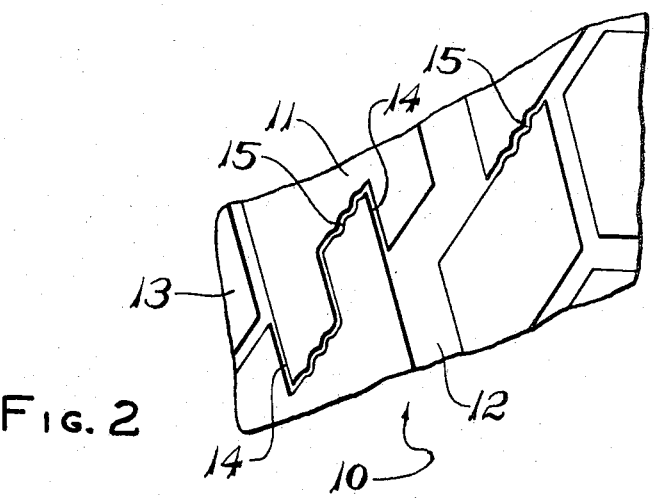
FIG. 2 is an enlarged fragmentary portion of the traction pattern shown in FIG. 1 as it appears after a portion of the tread surface has been removed.

The slit-like grooves 14 are, in accordance with this invention, so formed that the edges thereof at the tread surface are a plurality of angularly intersecting straight lines which provide the desired tread pattern configuration. The sidewalls of at least the portions of these grooves comprising transverse boundaries of the H-shaped and diamond shaped blocks are, however, of non-linear configuration in regions radially inwardly of the outer surface of the tread. Thus, as shown in FIG. 2, which illustrates a portion of the tread pattern of FIG. 1 after the radially outer surface thereof has been removed, the portions 15 of the grooves 14 have sidewalls of corrugated or undulating, preferably sinuous, configuration. The parts of the slit-like grooves 14 which provide boundaries between the leg portions of the H-shaped blocks may also be of similar configuration. However, in the illustrated embodiment, these portions of the slit-like grooves 14 have planar sidewalls throughout their depths.

The slit-like grooves 14 with their two different sidewall configurations are provided in the traction portion of the tire tread during molding by thin elongated mold members of appropriate configuration. In the preferred embodiment, these mold members are blade-like strips of metal one longitudinal edge portion of which has planar side faces while the other longitudinal edge portion is of undulating or corrugated cross section, preferably of sinuous configuration. Thus, as shown in FIG. 3, the mold member 16, which is utilized to form a slit-like groove 14 between two adjacent diamond shaped blocks of the tread shown in FIGS. 1 and 2, is an elongated strip of sheet metal one longitudinal edge portion 17 of which has planar side faces while the other longitudinal edge portion 18 has the sidewalls thereof in non-linear configuration as viewed in cross section. This non-linear configuration is preferably sinuous, as shown in FIG. 4, and extends from the edge portion 18 of the member 16 to a region short of the edge portion 17 where the sinuous configuration smoothly merges with the planar configuration. Preferably, the longitudinal extent of the planar edge portion 17 of the blade-like member 16 is greater than that of the non-linear edge portion 18.

The blade-like mold member 16 is employed by fixing it in the tread portion of a tire mold with the planar edge portion 17 adjacent the mold surface so that this portion becomes the outer edge portion of the molded slit-like groove 14 in the tire tread. The longitudinal edge portion 18 is in radially projecting relationship with respect to the mold surface and therefore forms the base of the slit-like groove 14 in the completed tire. The manner of fastening the blade-like member 16 in a tire mold is well understood in the art and hence is not here illustrated nor described in detail.

The thin elongated mold members 19 for forming the other slit-like grooves 14 between the H-shaped blocks in the tire tread are similar in general nature to the member 16 but specifically different in configuration to provide the requisite multi-angular configuration of these slit-like grooves in the tread pattern. As illustrated in FIG. 5, the thin elongated mold member 19 is formed as an elongated blade-like strip of sheet metal one longitudinal edge portion 20 of which is provided with planar side faces. Extending from this edge portion are spaced projecting segments 21 and 22 the sidewalls of which are corrugated or undulating in cross section. This configuration, is shown in FIG. 6, is preferably sinuous and, as shown in FIG. 5, extends from the longitudinal edge portions 23, 24 to a region adjacent the opposite edge portion 20 where the sinuous configuration of the sidewalls merges into the portion with the planar side surfaces. The segments 21, 22 of the member 19 are preferably spaced from each other and integrally connected by a portion 25 having planar side surfaces and of less width than the segments 21, 22. It is also referable that the planar sidewall portions of the member 19 extend longitudinally beyond the segments 21, 22 and that these end portions of the member 19 be of greater width adjacent the segments than at the free ends.

The member 19, before insertion in the tire mold, is bent from the strip-like configuration, shown in FIG. 5, to the configuration appropriate for forming the slit-like groove 14 between the H-shaped blocks. This configuration is illustrated in FIG. 7 wherein the member 19 has been shown inverted to facilitate illustration of the sinuous sidewall portions. After bending the member 19 to the appropriate configuration, it is inserted into the tire mold with the edge having the planar side surfaces 20 adjacent the mold surface as in the case for the mold member 16.

The thin mold members 16 and 19 are preferably provided with holes, such as 26, extending through the portions thereof having the planar sidewalls. These holes are for the purpose of facilitating venting of air and othergases in the molds during vulcanization of the tire. The location of these holes may be chosen as is necessary for effective venting action and their presence or absence does not in any way affect the principles of the invention.

A tire tread traction pattern having slit-like grooves as herein disclosed functions to prevent the entrance of foreign objects by reducing the freedom of these grooves in opening in response to attempted penetration by foreign objects. This feature, which is achieved by the corrugated or undulating configuration of the sidewalls of the grooves interiorly of the tread surface, does not, however, result in the appearance at the original tread surface of this configuration so that the new tires have the advantage of simplicity of pattern appearance while providing increased lateral stability due to the multiple surface interlocking sidewall configurations within the slit-like grooves. Furthermore, the presence of undulating or corrugated sidewalls in the grooves 14 acts upon any foreign bodies which attempt to penetrate the grooves in a manner which facilitates their dislodgment as the tire tread flexes in its rolling upon the road surface. This reduces the opportunity for foreign objects to be retained in the grooves sufficiently to permit "drilling" thereof into the tread with resulting damage to the tire.

The thin mold members for forming the slit-like grooves 14 are preferably sheet metal stampings. The invention in its broader aspects, however, is not limited to mold members formed in this manner and inserted into a mold but is considered as inclusive of similar members cast or otherwise formed in the mold. Furthermore, the invention is not limited to the illustrated configuration of the mold members nor to the particular tread pattern shown in the drawings. For example, the mold members 19 may have a generally serpentine configuration rather than the angular form illustrated in FIG. 7. These and other modifications and adaptations of the disclosed mold members and tread pattern formed thereby, which will be readily apparent to those skilled in the art, are considered as encompassed within the ambit of the invention which is limited only by the spirit and scope of the appended claims.

Having thus described the invention, we claim:

1. A thin elongated mold member for molding a narrow groove in the elastomer tread of a pneumatic tire, the said member having at least a part of its length provided with undulations extending transversely of the member from one longitudinal edge thereof having a planar end face which forms the radially inner portion of said molded groove to a location adjacent to but spaced from the other longitudinal edge of the member which forms the outer portion of the said groove.

2. A thin elongated mold member for molding a narrow groove in the elastomer tread of a pneumatic tire, the said member having at least a part of its length corrugated transversely with the corrugations extending from one longitudinal edge of the member having a planar end face which forms the radially inner portion of said molded groove to a location adjacent to but spaced from the other longitudinal edge of the member, the said insert having at least one opening extending through the portion devoid of corrugations.

3. An insert for the tread portion of a mold for a vehicle tire with an elastomer tread, which insert is adapted to project radially inwardly of the mold surface to form a narrow groove in the tread of the molded tire, the said insert comprising an elongated strip of thin metal one longitudinal edge porton of which is insertable into the mold surface and has planar side faces while the other longitudinal edge portion thereof has an undulating cross section the end face of which is planar.

4. An insert for the tread portion of a mold for a vehicle tire with an elastomer tread, which insert is adapted to project radially inwardly of the mold surface to form a narrow groove in the tread of the molded tire, the said insert comprising an elongated strip of thin metal one longitudinal edge portion of which is insertable into the mold surface and has planar side faces while the other longitudinal edge portion thereof has an undulating cross section and a planar end face, the longitudinal extent of said edge portion with the planar side faces being greater than that of the portion which has the undulating cross section with the end regions of said portion having the planar side faces of lesser width than the portion of undulating cross section.

5. An insert for the tread portion of a mold for a vehicle tire with an elastomer tread, which insert is adapted to project radially inwardly of the mold surface to form a narrow groove in the tread of the molded tire, the said insert comprising an elongated sheet metal stamping one longitudinal edge portion of which is insertable into the mold surface and has planar side faces, the said one portion being provided with a plurality of openings therethrough spaced from the boundaries of the portion, and the other longitudinal edge portion having a sinuous cross section with a planar end face, the longitudinal extent of said edge portion with the planar side faces being greater than that of the portion which has the sinuous cross section with the end regions of the said portion having the planar side faces of lesser width than the portion of sinuous cross section.

References Cited

UNITED STATES PATENTS

| 592,961 | 11/1897 | Brooks | 30—355 |
| 2,587,297 | 2/1952 | Duerksen | 18—44 |
| 2,736,924 | 3/1956 | Bean | 18—44 |
| 2,779,060 | 1/1957 | Knox | 18—44 X |
| 2,808,621 | 10/1957 | Torrey | 18—44 X |
| 2,834,108 | 5/1958 | Thompson | 30—355 |

FOREIGN PATENTS 867,556  5/1961  Great Britain.

J. SPENCER OVERHOLSER, *Primary Examiner.*

J. HOWARD FLINT, *Examiner.*